United States Patent [19]
Mayeda

[11] 3,881,189
[45] Apr. 29, 1975

[54] TRANSDUCER ARRANGEMENT IN RECORDING AND/OR PLAYBACK DEVICES UTILIZING DISC RECORDS

[75] Inventor: Akira Mayeda, Nishinomiya, Japan

[73] Assignee: Sanyo Electric Co., Ltd., Osaka, Japan

[22] Filed: Sept. 5, 1973

[21] Appl. No.: 394,412

[30] Foreign Application Priority Data

| | | |
|---|---|---|
| Sept. 7, 1972 | Japan | 47-89873 |
| Oct. 13, 1972 | Japan | 47-103026 |
| Apr. 20, 1973 | Japan | 48-45503 |

[52] U.S. Cl. ................. 360/106; 360/109; 360/130
[51] Int. Cl. ........................ G11b 5/56; G11b 25/04
[58] Field of Search ....... 360/106, 97, 107, 86, 109, 360/130, 105, 104

[56] References Cited

UNITED STATES PATENTS

| | | | |
|---|---|---|---|
| 3,210,082 | 10/1965 | Murata | 360/107 |
| 3,449,735 | 6/1969 | Cogar | 360/106 |
| 3,450,409 | 6/1969 | Pitzer | 360/106 |
| 3,634,836 | 1/1972 | Huetten et al. | 360/106 |
| 3,769,467 | 10/1973 | Garbor | 360/106 |

*Primary Examiner*—Alfred H. Eddleman
*Attorney, Agent, or Firm*—Staas & Halsey

[57] ABSTRACT

A transducer arrangement for use in a recording and/or playback device utilizing a magnetic disc record. This transducer arrangement employs a motion translator in the form of a strip having a tongue which is doubled back through a slot formed in the strip thereby providing a loop. A cylindrical body rotatable by a motor is inserted through the loop and secured thereto whereby rotation of the cylindrical body is translated into a linear movement of a transducer arm carrying the transducer head. The transducer head is adjustably carried by the transducer arm for adjustment of the contact pressure present between the disc record and the head.

20 Claims, 6 Drawing Figures

Figures 1, 2, 5:
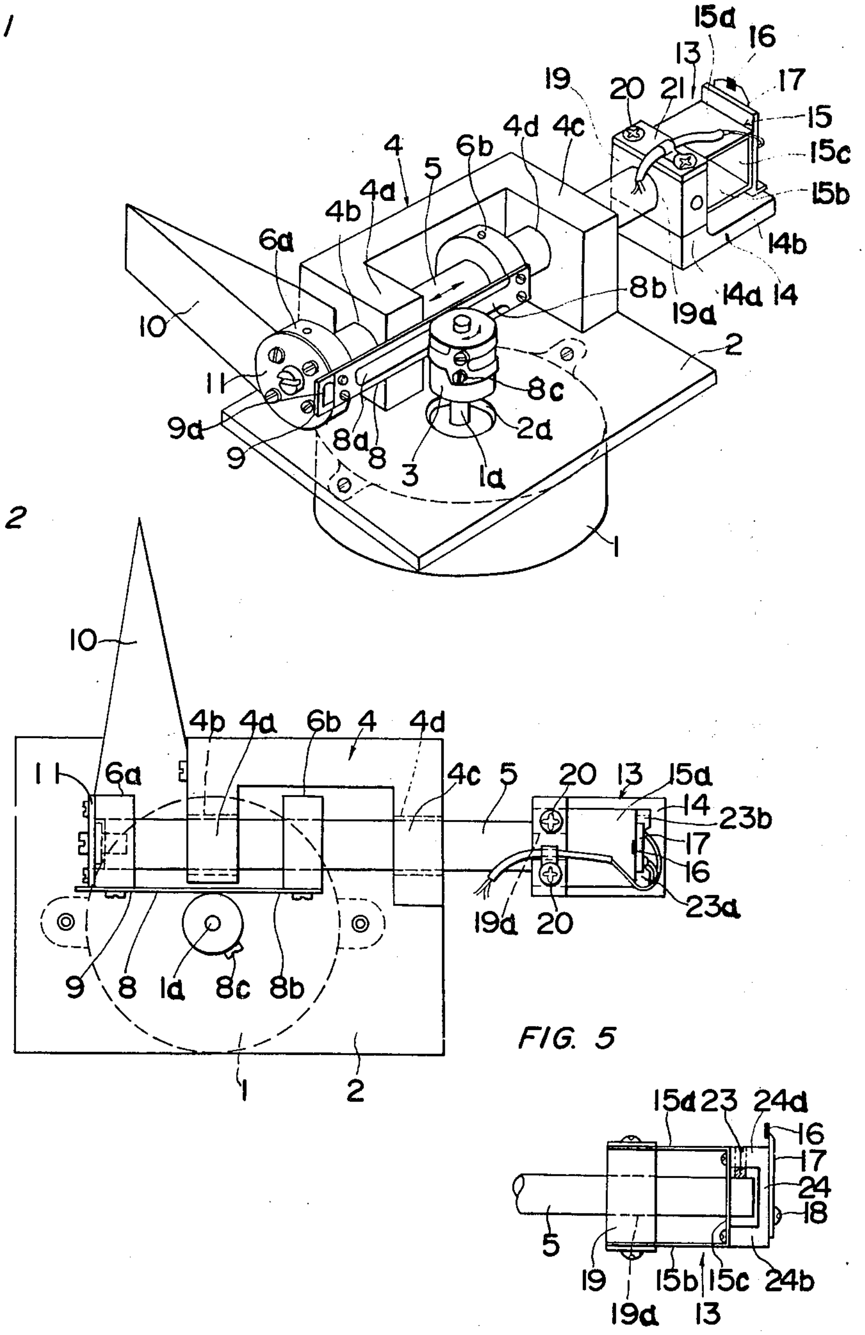

TRANSDUCER ARRANGEMENT IN RECORDING AND/OR PLAYBACK DEVICES UTILIZING DISC RECORDS

The present invention relates to a magnetic recording and/or playback device utilizing a flexible disc record formed of foil and, more particularly, to a transducer arrangement for precisely and steadily positioning the transducer head relative to the flexible disc record.

In recording and/or playback of audio or video signals, a flexible foil-type disc record made of synthetic material and coated on at least one surface thereof with a magnetizable material is still widely used as well as a magnetic tape. Unlike a magnetic tape recording and/or playback device, a recording and/playback device utilizing the flexible foil-type disc record has a transducer which, during operation thereof, moves across the magnetizable material coated surface of the disc record in the diametrical direction while said disc record is rotated at a relatively high speed. Positioning of the transducer head relative to the disc record is, accordingly, effected by moving the transducer head to a desired position on the magnetizable material coated surface of the disc record.

In most conventional devices of the type above referred to, this movement of the transducer head is carried out by the use of a motion translator which comprises a pinion gear mounted on a motor shaft for rotation together with said motor shaft and a rack rigidly mounted on a transducer slider or arm carrying the transducer head at one end. The pinion gear is engaged to the rack whereby rotation of the pinion gear about the motor shaft is translated into a linear motion of the rack and, hence, the transducer arm. The employment of this type of motion translator has many disadvantages, for example, in that an unfavorable backlash often occurs between the pinion gear and the rack and in that, depending on the state of engagement between the pinion gear and the rack, variation often occurs in the angular velocity of the pinion gear which brings about variation in the speed of linear movement of the transducer arm. These disadvantages, unless otherwise eliminated by precisely dimensioning and assembling the pinion and rack arrangement, often constitute a cause for difficulties experienced in precisely positioning the transducer head relative to the disc record and resultant reduction of recording and/or playback characteristics of the disc record.

As for the recording and/or playback characteristics, it is also affected by the contact pressure exerted between the transducer head and the magnetizable material coated surface of the disc record. In other words, if this contact pressure is inadequately adjusted, the recording and/or playback characteristics are adversely affected. In view of this, the transducer is, heretofore, adjustably mounted on the transducer arm for sliding movement in a direction perpendicular to the plane of the disc record. More specifically, the transducer carriage is formed with a guide groove and the transducer is formed at an appropriate portion with a mating projection slidably engaged in the guide groove. One or more lock screws are employed to lock the transducer carriage in position relative to the transducer arm. In this adjustment arrangement, in view of the presence of a minute gap between the groove faces of the guide groove and the mating projection, errors often occur each time adjustment of the contact pressure is carried out. Therefore, precise adjustment cannot be appreciated without any difficulties.

Accordingly, an essential object of the present invention is to provide a transducer arrangement which improves the fidelity of reproduction in a recording and/or playback device utilizing the magnetic foil-type disc record.

Another object of the present invention is to provide a transducer arrangement of the type above referred to, which more precisely positions the transducer head relative to the disc record, permitting the transducer arm to uniformly and smoothly move in a direction diametrical of the disc record in parallel to the plane of rotation of the disc record.

A further object of the present invention is to provide a transducer arrangement of the type above referred to, wherein the transducer is mounted to the transducer arm for adjustment in a direction perpendicular to the plane of the disc record without forming any gap between the transducer and the transducer arm supporting said transducer.

A still further object of the present invention is to provide a transducer arrangement of the type above referred to, which can be easily assembled without substantially requiring precise adjustment during the manufacturing cost.

According to the present invention, a transducer arrangement essentially comprises a transducer arm slidably supported for movement in a direction parallel to the disc record. The transducer arm has one end carrying a transducer adapted to move across and in a diametrical direction of the disc record in engagement with the magnetizable material coated surface of the disc record. The transducer includes a transducer carriage rigidly carried by the transducer arm and a transducer head adjustably carried by the transducer carriage through a substantial pair of elastic plate members spaced in parallel relation to each other. One or more adjustment screws are provided for deforming these elastic plate members simultaneously to control the contact pressure present between the transducer head and the magnetizable material coated surface of the disc record.

Furthermore, for translating a rotary motion of a motor shaft into a linear motion of the transducer arm, a motion translator such as substantially disclosed in the U.S. Pat. No. 3,488,098, patented on Jan. 6, 1970, is employed. Therefore, advantages resulting from the employment of this type of motion translator are apparent from the above numbered patent.

Figure 3:
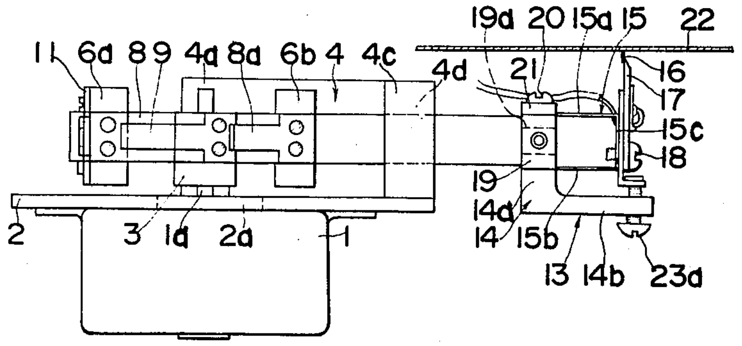
Figures 4, 6:
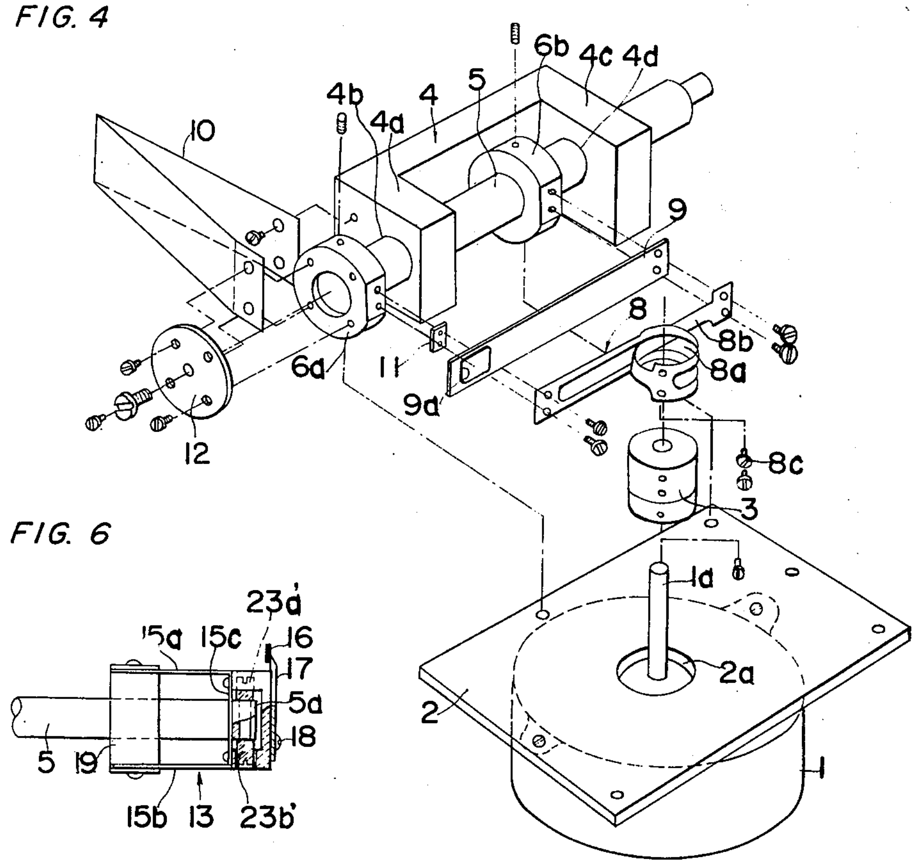

These and other objects and features of the present invention will become apparent from the following description taken in conjunction with preferred embodiments thereof with reference to the accompanying drawings, in which;

FIG. 1 is a perspective view of a transducer positioning mechanism according to the present invention, FIG. 2 is a top plan view of the transducer positioning mechanism according to the present invention, FIG. 3 is a side elevational view of the transducer positioning mechanism of FIG. 1, FIG. 4 is an exploded view of a transducer positioning mechanism of FIG. 1, FIG. 5 is a side elevational view of a transducer, showing another example of a head adjusting mechanism according to the present invention, and FIG. 6 is a similar view to FIG. 5, showing a further example of the head adjusting mechanism according to the present invention.

Before the description of the present invention proceeds, it is to be noted that like parts are designated by like reference numerals throughout the several views of the accompanying drawings. In addition, although the description proceeds of the present invention embodied in a magnetic recording and/or playback device utilizing a flexible foil-type disc record, it is to be noted that the concept of the present invention can be equally applicable to a record player, i.e., phonograph or gramophone, in view of the fact that the record player wherein the tonearm moves across the surface of a disc record has been already developed.

Referring now to the drawings, particularly, FIG. 1 to FIG. 4, the transducer arrangement according to the present invention comprises an electrically operated motor 1, which may be in the form of a pulse controlled motor, supported in position by a suitable base 2. The motor 1 has a drive shaft 1a having a free end rigidly mounted with a cylindrical body 3 of circular cross section, a substantially intermediate portion of which loosely extends through an opening formed as at 2*a* in the base 2.

A substantially channel shaped frame 4 having a pair of spaced arms 4*a* and 4*c* is rigidly mounted on the base 2 with one of the arms 4*a* located adjacent to, but in spaced relation to, the cylindrical body 3. The arms 4*a* and 4*c* are respectively formed with holes 4*b* and 4*d* which are aligned with each other. A slidable rod 5 of a cross section, for example, circular cross section, mating with the contour of each hole 4*b* and 4*d*, is slidably inserted through said holes 4*b* and 4*d* for axial sliding movement and has one end rigidly carrying a transducer 13 which will be mentioned later. The slidable rod 5 is rigidly mounted with a pair of annular rigid blocks 6*a* and 6*b*; one located adjacent to the other end of said slidable rod 5 and the other being on a substantially intermediate portion thereof and situated between the arms 4*a* and 4*c* of the frame 4.

A motion translator for translating a rotary motion of the cylindrical body 3 into a linear motion of the slidable rod 5 comprises a strip 8 of flexible material having formed therein a slot 8*a* and having a tongue 8*b* integrally extending from one end of the strip 8. The tongue 8*b* of the strip 8 is doubled back through the slot 8*a* to form a loop through which the cylindrical body 3 is inserted. It is to be noted that the loop thus formed is drawn tight around the cylindrical body 3 and secured in position to said cylindrical body 3 by the use of set screws 8*c* while the other end of said strip 8 and the tip of said tongue 8b are respectively secured to the solid blocks 6*a* and 6*b* in any suitable method, for example, by the use of set screws.

In the arrangement so far described, it is clear that rotation of the cylindrical body 3 about the motor shaft 1a draws therearound, either the remaining portion of the strip 8 which does not form a part of the loop or the remaining portion of the tongue 8*b* which does not form the rest of the loop, depending on the direction of rotation of the motor shaft 1*a*. Consequently, it is obvious that the rotation of the cylindrical body 3 causes the slidable rod 5 to move in the axial direction.

In any event, reference may be made to the U.S. Pat. No. 3,488,094 in connection with the details of operation of this type of motion translator. However, it should be noted that the strip 8 including the tongue 8b may be preferably made of a strip of polyester reinforced with glass fibers, each extending in the lengthwise direction of the polyester strip, so as to restrain it from expanding, or of a thin strip of beryllium containing steel.

As best shown in FIG. 4, an elastic plate member 9 may be employed to back up the motion translator, i.e., the strip 8 so that the latter can be steadily held in position. For this purpose, one end of this elastic plate member 9 is secured to the block 6*b* and held in position between said block 6*b* and the tip of the tongue 8*b* while the other end is formed with a slot 9*a* receiving therein a spacer piece 11 which is rigidly held in position between the block 6*a* and that end of the strip 8.

A substantially V-shaped spring plate 10 has one end rigidly secured to the frame 4 and the other end to the block 6*a* by means of a covering disc 12 secured to said block 6*a*. This spring plate 10 is utilized, if the slidable rod 5 is of circular cross section as shown, to prevent said slidable rod 5 from circumferentially displacing about its own longitudinal axis. In any event, this spring plate 10 may be omitted not only if the slidable rod 5 has a cross section of a shape other than circular, but also if the strip 8 has a sufficient width and is hard to twist.

In the foregoing arrangement, it should be understood that the motor 1 receives a power supply each time a push button switch (not shown) is operated. Reverse rotation of the motor 1 may be effected in response to an electrical signal generated from a position detector which detects completion of sliding movement of the slidable rod 5 from one position to another, although this detector and its associated circuit elements are not shown.

Referring still to FIGS. 1 to 3, the transducer 13 comprises a transducer carriage 14 of substantially L-shaped configuration having a short section 14*a* and a long section 14*b*, and a substantially channel-shaped elastic support 15 having a pair of parallel sections 15*a* and 15*b* and a connecting section 15*c*. A transducer head 16 is rigidly carried by a support plate 17 which is rigidly secured to the connecting section 15*c* by the use of a plurality of set screws 18.

The parallel sections 15*a* and 15*b* of the elastic support 15 is spaced by a spacer block 19 which is in turn mounted on the short section 14*a* of the transducer carriage 14. These elements are assembled in position as shown in FIG. 1 by the use of at least one pair of set screws 20 both extending through a presser plate 21, the section 15*a*, the spacer block 19 and the section 15*b* in the order given above and finally tapped into the short section 14*a*. The spacer block 19 is formed with a mounting opening 19*a* through which said transducer 13 is mounted on the other end of the slidable rod 5 with the transducer head 16 facing towards the surface of a disc record 22.

In the embodiment shown, a pair of adjustment screws 23*a* and 23*b* are threadably engaged through the long section 14*b* of the carriage 14 and terminating in contact with an edge of the support plate 17 remote from the transducer head 16. If both the adjustment screws 23*a* and 23*b* are simultaneously adjusted, the head 16 moves in the plane perpendicular to the surface of the disc record 22 with the parallel sections 15*a* and 15*b* uniformly deforming relative to the plane parallel to the surface of the disc record 22. By doing this way, the contact pressure between the head 16 and the surface of the disc record 22 can be advantageously controlled.

On the other hand, if either of these adjustment screws 23*a* and 23*b* is adjusted, the head 16 can be angularly displaced with respect to the longitudinal axis of the slidable rod 5 while moving in the plane perpendicular to the surface of the disc record 22 with the parallel sections 15*a* and 15*b* somewhat twisting about the lengthwise directions thereof.

The number of the adjustment screws 23a and 23b is not always limited to two, but may be provided in one or three. If a single adjustment screw is to be employed, it must be positioned at a substantially intermediate portion between the adjustment screws. In case of three adjustment screws, an additional one should be positioned at a substantially intermediate portion between the adjustment screws 23*a* and 23*b*.

In the embodiment shown in FIG. 5, the slidable rod 5 extends through the mounting opening 19*a* of the spacer block 19, pressure-fitted thereto, via a slot (not shown) formed in the connecting section 15*c* of the elastic support 15 and terminating within a space defined by a pair of legs 24*a* and 24*b* of a channel shaped block 24, the latter being rigidly secured to the connecting section 15*c* through a plurality of set screws.

The support plate 17 carrying the head 16 is secured in position to the channel shaped block 24 by the set screws 18. An adjustment screw 23 is adjustably threaded through the leg 24*a* and terminating in contact with the end of the slidable rod 5 within the space defined by the legs 24*a* and 24*b* of the channel shaped block 24.

In this arrangement, by turning the adjustment screw 23, the contact pressure between the head 16 and the disc record can be controlled in the same way as in the foregoing embodiment.

In the embodiment shown in FIG. 6, instead of the adjustment screw shown in FIG. 5, an adjustment member corresponding in function to said adjustment screw 23 is employed in the form of a pin member having both ends made into respective threaded heads 23*a'* and 23*b'*, an intermediate portion of which has a length substantially equal to the diameter of the end of the slidable rod 5 and a diameter smaller than that of either of the threaded heads 23*a'* and 23*b'*. This intermediate portion of said adjustment member is received in a split groove 5*a*, formed in the end of the slidable rod 5, of a width smaller than the diameter of either of the threaded heads 23*a'* and 23*b'* whereby axial movement of said pin member effected by turning either of the threaded heads 23*a'* and 23*b'* is accompanied by movement of the head 16 in the plane perpendicular to the surface of the disc record with the parallel sections 15*a* and 15*b* correspondingly deformed.

Either of these embodiments of FIGS. 5 and 6 satisfactorily and effectively functions in a similar manner as in the first mentioned embodiment without any substantial reduction in performance.

Although the present invention has been fully described by way of examples, it should be noted that various changes and modifications are apparent to those skilled in the art and, therefore, unless otherwise they depart from the true scope of the present invention, they should be understood as included therein.

What we claim are:

1. A transducer arrangement for use in a recording and/or playback device utilizing a disc record which is rotated about its own axis, which comprises a transducer arm, a framework for supporting said transducer arm for axial sliding movement in a diametrical direction of the disc record, means for moving said transducer arm in said diametrical direction, a transducer head for recording and/or reproducing signals on the disc record in contact therewith, elastic means for yieldingly mounting said transducer head on one end of said transducer arm, and adjustment means operatively associated with said elastic means for moving said elastic means into a selected deformed condition for movement of said transducer head into a selected position along a path extending substantially perpendicular to said disc record for adjusting the contact pressure between said transducer head and said disc record.

2. A transducer arrangement as claimed in claim 1, further comprising means for preventing rotary movement of said transducer arm about its longitudinal axis.

3. A transducer arrangement as claimed in claim 1, wherein said moving means comprises a motion translator for reversibly translating angular motion into linear motion, said motion translator including a strip having a slot formed therein and an elongated tongue extending from one end of said strip, said tongue being doubled back through said slot to form a loop, the other end of said strip and the free end of said tongue being respectively secured to said transducer arm in spaced relation to each other, a cylindrical body, a motor for rotating said cylindrical body, said cylindrical body being inserted through said loop and secured thereto whereby rotation of said cylindrical body by said motor moves said transducer arm linearly in said diametrical direction.

4. A transducer arrangement as claimed in claim 3, wherein said motor is a pulse controlled motor.

5. A transducer arrangement as claimed in claim 1, wherein said elastic means comprises a pair of elastically deformable plate members extending in parallel relation to each other and each having one end connected to said transducer head and the other end connected to said one end of said transducer arm.

6. A transducer arrangement as claimed in claim 5, wherein said adjustment means comprises an adjustment screw having one end in operative engagement with one of said plate members adjacent to said transducer head for moving said plate members simultaneously into said selected deformed condition.

7. A transducer arrangement as claimed in claim 5, wherein said adjustment means comprises an adjustment screw supported on said elastic means and having one end in engagement with said transducer arm adjacent said transducer one end for moving said plate members simultaneously into said selected deformed condition.

8. A transducer arrangement as claimed in claim 5, wherein said adjustment means comprises an adjustment pin having enlarged threaded portions at each end and an intermediate portion of reduced diameter, said transducer arm being provided with a diametrically extending groove in the end face of said arm adjacent said one end for accommodating said pin intermediate portion and means supported on said plate members threadedly engageable with said threaded end portions on said pin for moving said plate members simultaneously into said selected deformed condition.

9. A transducer arrangement for use in a recording and/or playback device utilizing a disc record which is rotated about its own axis, which comprises:

a. a substantially cylindrical transducer arm;

b. a framework for supporting said transducer arm for axial sliding movement in a diametrical direction of said disc record;

c. a pair of retaining blocks, rigidly mounted on said transducer arm in spaced relation to each other, one of said retaining blocks being positioned adjacent one end of said transducer arm;

d. an electrically operated motor having a drive shaft;

e. a motion translator for reversibly translating angular motion into linear motion, said motion translator including a strip having a slot formed therein and an elongated tongue extending from one end of said strip, said tongue being doubled back through said slot to form a loop, the other end of said strip and the free end of said tongue being respectively secured to said retaining blocks on said transducer arm, said drive shaft of said motor being inserted through said loop and secured thereto whereby rotation of said drive shaft by said motor moves said transducer arm linearly in said diametrical direction.

f. a transducer head for recording and/or reproducing signals on the disc record in contact therewith;

g. a spacer block rigidly mounted on said transducer arm adjacent the other end of said transducer arm;

h. elastic means for yieldingly mounting said transducer head on said spacer block, said elastic means including a first elastic plate member having one end rigidly connected to said spacer block, a second elastic plate member having one end rigidly connected to said spacer block in spaced relation to said one end of said first elastic plate member, and a connecting plate member having both ends rigidly connected to the other ends of said first and second elastic plate members, said first and second elastic plate members extending in substantially parallel relation to each other and to the longitudinal axis of said transducer arm;

i. means for rigidly mounting said transducer head on said connecting plate member; and j. adjustment means operatively associated with said first and second elastic plate members for moving said first and second plate members along a path extending substantially perpendicular to the plane of each of said first and second elastic plate members for adjusting the contact pressure between said transducer head and said disc record.

10. A transducer arrangement as claimed in claim 9 further comprising means for preventing rotary movement of said transducer arm about its longitudinal axis.

11. A transducer arrangement as claimed in claim 9 wherein said motor is a pulse controlled motor.

12. A transducer arrangement in accordance with claim 9, wherein said adjustment means comprises an adjustment screw having one end in operative engagement with one of said plate members adjacent to said transducer head for moving said plate members simultaneously to adjust said contact pressure.

13. A transducer arrangement in accordance with claim 9, wherein said adjustment means comprises an adjustment screw supported on said elastic means and having one end in engagement with said transducer arm adjacent said other end for moving said plate members simultaneously to adjust said contact pressure.

14. A transducer arrangement in accordance with claim 9, wherein said adjustment means comprises an adjustment pin having enlarged threaded portions at each end and an intermediate portion of reduced diameter, said transducer arm being provided with a diametrically extending groove in the end face of said arm adjacent said other end for accommodating said pin intermediate portion and means supported on said plate members threadedly engageable with said threaded end portions on said pin for moving said plate members simultaneously to adjust said contact pressure.

15. A transducer arrangement as claimed in claim 10, wherein said preventing means comprises a substantially V-shaped spring plate having one end rigidly connected to said framework and the other end rigidly connected to said one retaining block.

16. A transducer arrangement as claimed in claim 9, wherein said spacer block has a first section rigidly mounted on said other end of said transducer arm and a second section rigidly connected to said first section at right angles to said first section with said one end of said second elastic plate member sandwiched between said first and second sections, the plane of said second section being in substantially parallel relation to the plane of each of said first and second elastic plate members, and wherein said adjustment means comprises an adjustment screw threaded through said second section adjacent said connecting plate member and having one end in operative engagement with said second elastic plate member.

17. A transducer arrangement as claimed in claim 9, wherein said connecting plate member is formed with a bore of a diameter greater than the diameter of said transducer arm, said other end of said transducer arm loosely extending through said bore and within the clearance space defined by said first and second elastic plate members and wherein said means for mounting said transducer head on said connecting plate member includes a substantially U-shaped spacer block, said U-shaped spacer block having a pair of opposed leg portions and a bite portion integrally formed with said leg portions, the free ends of said respective leg portions being rigidly secured to said connecting plate member, said other end of said transducer arm terminating within a space defined by said connecting plate member, said leg portions and said bite portion, and means for securing said transducer head to the surface of said bite portion opposite said connecting plate member.

18. A transducer arrangement as claimed in claim 17, wherein said adjustment means comprises an internally threaded opening in one of said leg portions, an adjustment screw extending through said internally threaded opening in threaded engagement therewith and having one end in engagement with said other end of said transducer arm.

19. A transducer arrangement as claimed in claim 17, wherein said other end of said transducer arm has an end face facing said bite portion of said U-shaped spacer block, said end face being provided with an outwardly opening groove extending at right angles to the longitudinal axis of said transducer arm and perpendicular to the disc record and wherein said adjustment means comprises a pin member having enlarged portions at each end and an intermediate portion of reduced diameter accommodated within said groove with said enlarged portions disposed on opposite sides of said transducer arm, and wherein at least one of said leg portions of said U-shaped spacer block is provided with an internally threaded opening, and wherein one of said enlarged portions is externally threaded for threaded engagement with said internally threaded opening and an opening in the other leg portion of said U-shaped spacer block for accommodating the other enlarged portion of said pin member.

20. A transducer arrangement for use in a recording and/or playback device utilizing a disc record which is rotated about its own axis, which comprises:

a. a substantially cylindrical transducer arm;

b. a framework for supporting said transducer arm for axial sliding movement in a diametrical direction of the disc record;

c. a pair of retaining blocks rigidly mounted on said transducer arm in spaced relation to each other, one of said retaining blocks being positioned adjacent one end of said transducer arm;

d. a pulse controlled motor having a drive shaft;

e. a motion translator for reversibly translating angular motion into linear motion, said motion translator including a strip having a slot formed therein and an elongated tongue extending from one of end said strip, said tongue being doubled back through said slot to form a loop, the other end of said strip and the free end of said tongue being respectively secured to said retaining blocks on said transducer arm, said drive shaft of said motor being inserted through said loop and secured thereto whereby rotation of said drive shaft by said motor moves said transducer arm linearly in said diametrical direction;

f. a transducer head for recording and/or reproducing signals on the disc record in contact therewith;

g. a spacer block rigidly mounted on said transducer arm adjacent the other end of said transducer arm; and h. elastic means for yielding by mounting said transducer head on said spacer block, said elastic means including a first elastic plate member having one end rigidly connected to said spacer block, a second elastic plate member having one end rigidly connected to said spacer block in spaced relation to said one end of said first elastic plate member, and a connecting plate member having both ends rigidly connected to the other ends of said first and second elastic plate members, said first and second elastic plate members extending in substantially parallel relation to each other and to the longitudinal axis of said transducer arm; and i. means for rigidly mounting said transducer head on said connecting plate member.

* * * * *